US012385166B2

(12) United States Patent
Chen et al.

(10) Patent No.: US 12,385,166 B2
(45) Date of Patent: Aug. 12, 2025

(54) DEVICE AND METHOD FOR TWISTING ELECTROSTATIC SPINNING SUPERFINE FIBER

(71) Applicant: QINGDAO UNIVERSITY OF SCIENCE AND TECHNOLOGY, Qingdao (CN)

(72) Inventors: Hongbo Chen, Qingdao (CN); Wenwen Han, Qingdao (CN); Weimin Yang, Qingdao (CN); Haichao Liu, Qingdao (CN); Hui Liang, Qingdao (CN); Chuansheng Wang, Qingdao (CN)

(73) Assignee: QINGDAO UNIVERSITY OF SCIENCE AND TECHNOLOGY, Qingdao (CN)

( * ) Notice: Subject to any disclaimer, the term of this patent is extended or adjusted under 35 U.S.C. 154(b) by 0 days.

(21) Appl. No.: 17/905,948

(22) PCT Filed: Jul. 19, 2021

(86) PCT No.: PCT/CN2021/107034
§ 371 (c)(1),
(2) Date: Sep. 9, 2022

(87) PCT Pub. No.: WO2022/267119
PCT Pub. Date: Dec. 29, 2022

(65) Prior Publication Data
US 2023/0407530 A1     Dec. 21, 2023

(30) Foreign Application Priority Data
Jun. 22, 2021 (CN) .......................... 202110691029.9

(51) Int. Cl.
*D01H 1/08* (2006.01)
*D01D 5/00* (2006.01)
*D01H 1/26* (2006.01)

(52) U.S. Cl.
CPC ............. *D01H 1/08* (2013.01); *D01D 5/0069* (2013.01); *D01D 5/0076* (2013.01); *D01D 5/0092* (2013.01); *D01H 1/26* (2013.01)

(58) Field of Classification Search
CPC .. D01H 1/08; D01H 1/26; D01D 5/18; D01D 5/0092; D01D 5/0069; D01D 5/0076; Y02P 70/62
See application file for complete search history.

(56) References Cited

FOREIGN PATENT DOCUMENTS

| CN | 101302682 A | 11/2008 |
| CN | 104358029 A | 2/2015 |

(Continued)

*Primary Examiner* — Monica A Huson
(74) *Attorney, Agent, or Firm* — Cooper Legal Group, LLC

(57) ABSTRACT

Disclosed is a device for twisting electrostatic spinning superfine fiber. The device comprises an outer sleeve and a middle sleeve, wherein the outer sleeve sleeves the middle sleeve, an annular gap is formed between the outer sleeve and the middle sleeve, a melt inlet communicating with the annular gap is formed in the outer sleeve, a conical hole is formed in the bottom end of the outer sleeve, the top end of the conical hole communicates with the bottom end of the annular gap, and the outer sleeve is wrapped with a heating ring used for heating a melt in the annular gap; a cylindrical metal rod is arranged in the middle sleeve in a penetrating mode, an interval is formed between the metal rod and the middle sleeve, the bottom end of the metal rod is fixedly connected with a circular truncated cone located below the conical hole.

19 Claims, 8 Drawing Sheets

(56) References Cited

FOREIGN PATENT DOCUMENTS

| | | |
|---|---|---|
| CN | 106283219 A | 1/2017 |
| CN | 109594135 A | 4/2019 |
| CN | 109722754 A | 5/2019 |
| CN | 110747523 A | 2/2020 |
| GB | 1338349 A | 11/1973 |

DEVICE AND METHOD FOR TWISTING ELECTROSTATIC SPINNING SUPERFINE FIBER

CROSS REFERENCE TO RELATED APPLICATIONS

This patent application claims the benefit and priority of Chinese Patent Application No. 202110691029.9 filed on Jun. 22, 2021, the disclosure of which is incorporated by reference herein in its entirety as part of the present application.

TECHNICAL FIELD

The present disclosure relates to the technical field of electrostatic spinning, in particular to a device and a method for twisting electrostatic spinning superfine fiber.

BACKGROUND ART

The electrostatic spinning technology is a fiber manufacturing method in which a polymer solution or a melt forms a jet flow under the action of a strong electric field and the jet flow is solidified to form fiber. As a special fiber manufacturing process, polymer fiber with nanoscale diameter can be produced through an electrostatic spinning technology, and the electrostatic spinning technology is considered as one of superfine fiber preparation methods with the most industrial prospect.

A non-woven fabric fiber felt is generally the product obtained by a traditional electrostatic spinning method, and the application range of the non-woven fabric fiber felt is limited. The fiber is bundled or twisted and collected, so that the tensile strength of the fiber can be improved, and ordered arrangement of the fiber can be promoted. The application potential of the electrostatic spinning method in the fields of spinning, sensors, tissue engineering and the like can be excited to a great extent.

At present, electrostatic spinning superfine fiber twisting technology is mostly achieved by using rotating water flow or air flow to drive the fiber bundle to be bundled and twisted. The technology has the defects of poor stability and uniformity, and the twist degree cannot be accurately controlled. Electrostatic spinning needs high-voltage static electricity and protection such as electrostatic isolation, so that mechanical bundling and twisting are difficult.

SUMMARY

The present disclosure aims to provide a device and a method for twisting electrostatic spinning superfine fiber so as to solve the problems in the prior art and improve the stability and the uniformity of electrostatic spinning fiber twisting.

In order to achieve the purpose, the present disclosure provides the following scheme.

The present disclosure provides a device for twisting electrostatic spinning superfine fiber, comprising an outer sleeve and a middle sleeve, wherein the outer sleeve sleeves the middle sleeve, an annular gap is formed between the outer sleeve and the middle sleeve, a melt inlet communicating with the annular gap is formed in the outer sleeve, a conical hole is formed in the bottom end of the outer sleeve, the top end of the conical hole communicates with the bottom end of the annular gap, and the outer sleeve is wrapped with a heating ring used for heating a melt in the annular gap; a cylindrical metal rod is arranged in the middle sleeve in a penetrating mode, an interval is formed between the metal rod and the middle sleeve, the bottom end of the metal rod is fixedly connected with a circular truncated cone located below the conical hole, the relatively large-area bottom surface of the circular truncated cone is fixedly connected with the bottom end of the metal rod, the relatively small-area bottom surface of the circular truncated cone is fixedly connected with a conical guide tip end, and the conical surface of the guide tip end is smoothly connected with the conical surface of the circular truncated cone; the metal rod, the circular truncated cone, the guide tip end and the annular gap are coaxial; and the device for twisting electrostatic spinning superfine fiber further comprises a roller below the guide tip end and a driving device capable of driving the metal rod to rotate, the metal rod is electrically connected with an output electrode of a high-voltage electrostatic generator, the circular truncated cone is conductive, the guide tip end is isolated, and the outer sleeve is grounded.

Preferably, the device for twisting electrostatic spinning superfine fiber further comprises an inner sleeve, wherein the metal rod is inserted into the inner sleeve, the metal rod is fixedly connected with the inner sleeve, the inner sleeve is in running fit with the middle sleeve through a sliding bearing, and the inner sleeve and the sliding bearing are arranged in the interval; a rolling bearing is further fixedly arranged at the top end of the middle sleeve, an outer ring of the rolling bearing is fixedly connected with the middle sleeve, the rolling bearing sleeves the inner sleeve, and the inner sleeve is in transition fit with an inner ring of the rolling bearing.

Preferably, an insulating shaft end sleeve is fixedly arranged at the top end of the metal rod, the driving device is an adjustable-speed motor, and an output shaft of the adjustable-speed motor is fixedly connected with the insulating shaft end sleeve through a coupler.

Preferably, a carbon brush support is fixedly arranged at the top end of the middle sleeve, the carbon brush support is connected with a carbon brush through a spring, the carbon brush support is further in threaded connection with a connecting screw, the connecting screw is electrically connected with an output electrode of the high-voltage electrostatic generator through a wire, the connecting screw is further fixedly connected with the end, away from the carbon brush, of the spring, and the carbon brush is in close contact with the side wall of the metal rod under the elastic force of the spring.

Preferably, the bottom end of the conical hole is an annular tip end; and a plurality of jet flow guide balls are uniformly arranged at the bottom end of the conical hole.

Preferably, the bottom end of the middle sleeve is further provided with a conical body coaxial with the metal rod corresponding to the conical hole, the conical body is located in the conical hole, an interval is formed between the conical surface of the conical body and the conical surface of the conical hole, the edge of the bottom end of the conical body extends out of the conical hole, the metal rod and the inner sleeve penetrate through the conical body, a gap is formed between the inner sleeve and the conical body, and the circular truncated cone is located below the conical body.

Preferably, the taper of the guide tip end is the same as that of the circular truncated cone, and the size of the bottom surface of the guide tip end is the same as that of the cross section of the circular truncated cone.

Preferably, the guide tip end is made of a high-temperature resistant insulating material such as polytetrafluoroethylene; and the circular truncated cone is made of graphite or metal.

Preferably, a plurality of semicircular grooves are uniformly formed in the side surface of the circular truncated cone, and the length direction of the semicircular groove is the same as the inclination direction of the side surface.

The present disclosure also provides a method for twisting electrostatic spinning superfine fiber based on the device for twisting electrostatic spinning superfine fiber, comprising the following steps:

firstly, winding one end of a section of insulating string for a plurality of circles along the side surface of the circular truncated cone, bonding with the side surface of the circular truncated cone, winding the other end of the insulating string on the roller for a plurality of circles, and turning on the high-voltage electrostatic generator;

secondly, after a polymer melt is melted and plasticized into a molten melt through an extruder, introducing the molten melt into the outer sleeve through the melt inlet, and meanwhile, opening the heating ring, wherein after flowing into the annular gap through the melt inlet, the molten melt continues to flow and is gradually and uniformly distributed in the circumferential direction, and then the molten melt continues to flow downwards to the inner side of the conical surface of the conical hole in the bottom of the outer sleeve; and the molten melt naturally flows downwards to the annular tip end at the bottom end of the outer sleeve along the inner wall surface due to the gravity effect and the adhesion effect and is annularly and uniformly distributed;

thirdly, due to the fact that the circular truncated cone is electrified after the high-voltage electrostatic generator is started, forming a high-voltage electric field between the surface of the circular truncated cone and the annular tip end at the bottom end of the outer sleeve so that the annular tip end at the bottom end of the outer sleeve is electrified in an induction mode, and adjusting the output voltage of the high-voltage electrostatic generator until the melt thin layer attached to the annular tip end is excited to form multiple jet flows under the action of the high-voltage electric field, wherein the multiple jet flows are self-organized and gradually and uniformly distributed to form multiple jet flows which are uniformly and stably spaced, the jet flows are cooled and solidified to form continuous superfine fiber, and due to the electrostatic adsorption effect, the continuous superfine fiber is adsorbed to the insulating string wound on the side surface of the circular truncated cone;

fourthly, turning on a rotary switch of the roller to enable the roller to rotate, winding the insulating string on the rotating roller so as to pull and wind the superfine fiber on the roller, continuously and automatically winding the bundled fiber on the roller due to the fact that the spun fiber is continuous long fiber, turning on the adjustable-speed motor to drive the circular truncated cone to rotate, twisting a fiber bundle adsorbed on the conical surface of the bottom of the circular truncated cone, and continuously collecting yarn formed after twisting by the roller; and fifthly, adjusting the yarn twist by adjusting the rotating speed of the adjustable-speed motor so that the yarn meets the technological requirements, and changing the quantity of jet flows formed by exciting the melt thin layer attached to the annular tip end by changing the output voltage of the high-voltage electrostatic generator so that the technological requirement of the quantity of fiber in the yarn is met.

Compared with the prior art, the present disclosure has the following technical effects.

According to the device and the method for twisting electrostatic spinning superfine fiber, the stability and the uniformity of electrostatic spinning fiber twisting are improved. According to the device and the method for twisting electrostatic spinning superfine fiber, multiple fibers generated at the annular tip end are adsorbed to the circular truncated cone through the electrostatic adsorption effect of the circular truncated cone, so that the purpose of bundling is achieved. Then, the fiber bundle is twisted through the rotation effect of the circular truncated cone, and finally twisted yarn is received by the roller and collected in a rolled mode. The device has the functions of bundling, twisting and collecting the superfine fiber prepared by the electrostatic spinning method, and has the advantages of high stability, high continuity, twist adjustability and the like.

BRIEF DESCRIPTION OF THE DRAWINGS

To more clearly illustrate the embodiment of the present disclosure or the technical scheme in the prior art, the following briefly introduces the attached figures to be used in the embodiment. Apparently, the attached figures in the following description show merely some embodiments of the present disclosure, and those skilled in the art may still derive other drawings from these attached figures without creative efforts.

Reference signs: 100, device for twisting electrostatic spinning superfine fiber; 1, outer sleeve; 2, middle sleeve; 3, annular gap; 4, sliding bearing; 5, inner sleeve; 6, metal rod; 7, circular truncated cone; 8, guide tip end; 9, melt inlet; 10, roller; 11, speed-adjustable motor; 12, output shaft; 13, coupler; 14, insulating shaft end sleeve; 15, set screw; 16, high-voltage electrostatic generator; 17, wire; 18, carbon brush support; 19, connecting screw; 20, spring; 21, carbon brush; 22, rolling bearing; 23, heating ring; 24, fiber; 25, yarn; 26, hemispherical body; 27, jet flow guide ball; 28, semicircular groove; 29, conical body; and 30, bolt.

DETAILED DESCRIPTION OF THE EMBODIMENTS

The following clearly and completely describes the technical scheme in the embodiments of the present disclosure with reference to the attached figures in the embodiments of the present disclosure. Apparently, the described embodiments are merely a part rather than all of the embodiments of the present disclosure. Based on the embodiment in the present disclosure, all other embodiments obtained by the ordinary technical staff in the art under the premise of without contributing creative labor belong to the scope protected by the present disclosure.

The present disclosure aims to provide a device and a method for twisting electrostatic spinning superfine fiber so as to solve the problems in the prior art and improve the stability and the uniformity of electrostatic spinning fiber twisting.

To make the foregoing objective, features and advantages of the present disclosure clearer and more comprehensible, the present disclosure is further described in detail below with reference to the attached figures and specific embodiments.

Embodiment I

Figure 1:
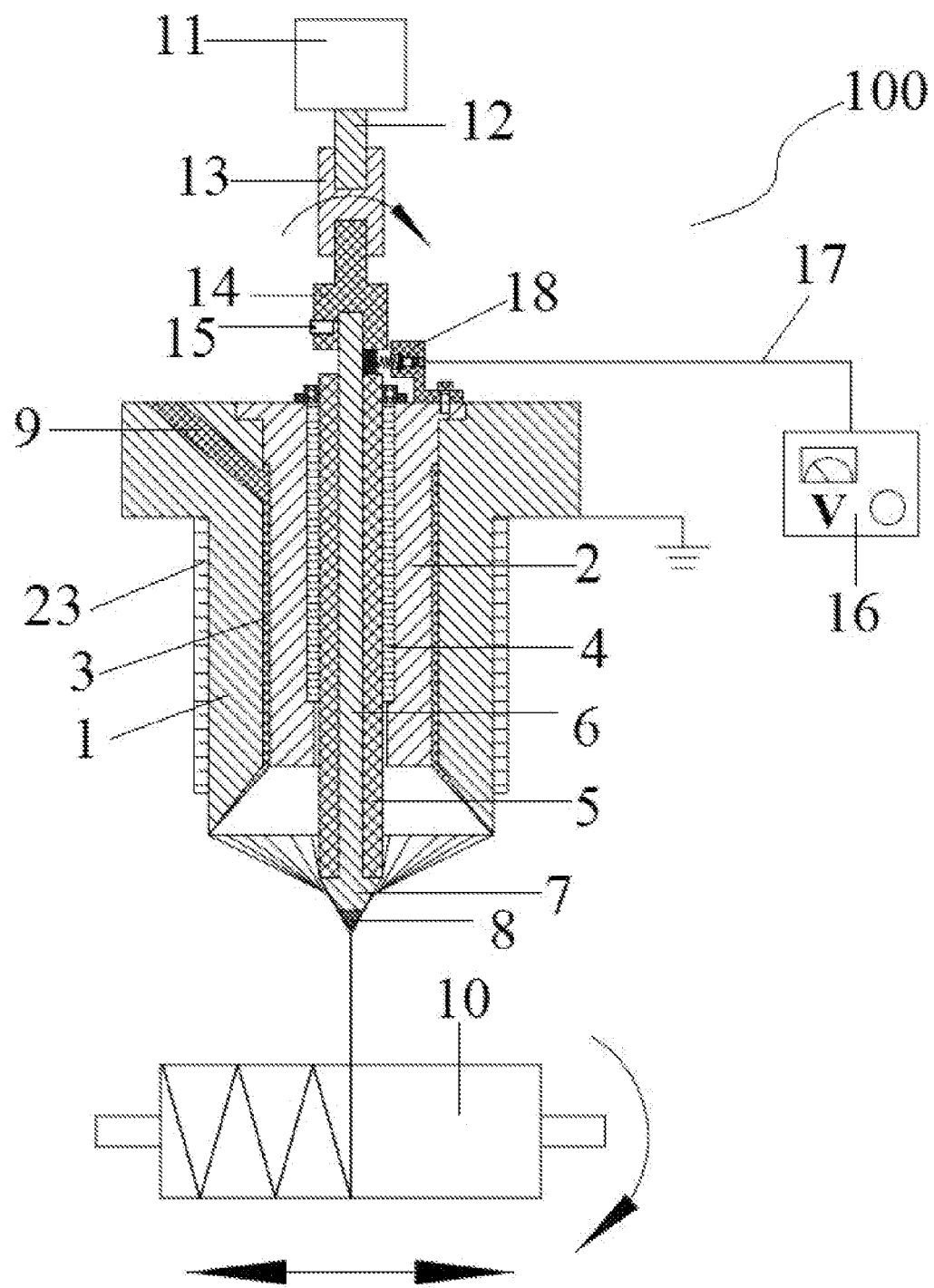
FIG. 1 is a structural schematic diagram of a device for twisting electrostatic spinning superfine fiber in the first embodiment of the present disclosure.
Figure 2:
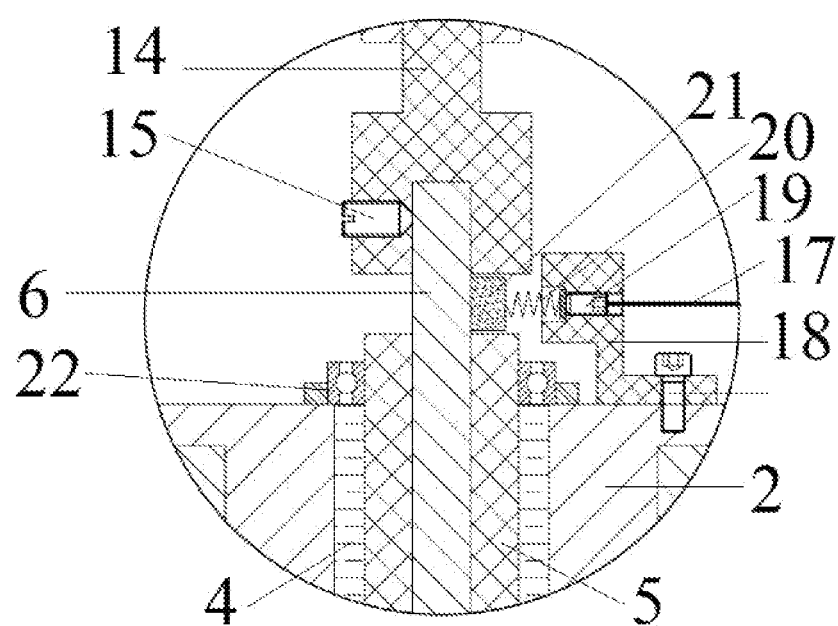
FIG. 2 is a partial structural schematic diagram I of a device for twisting electrostatic spinning superfine fiber in the first embodiment of the present disclosure.
Figure 3:
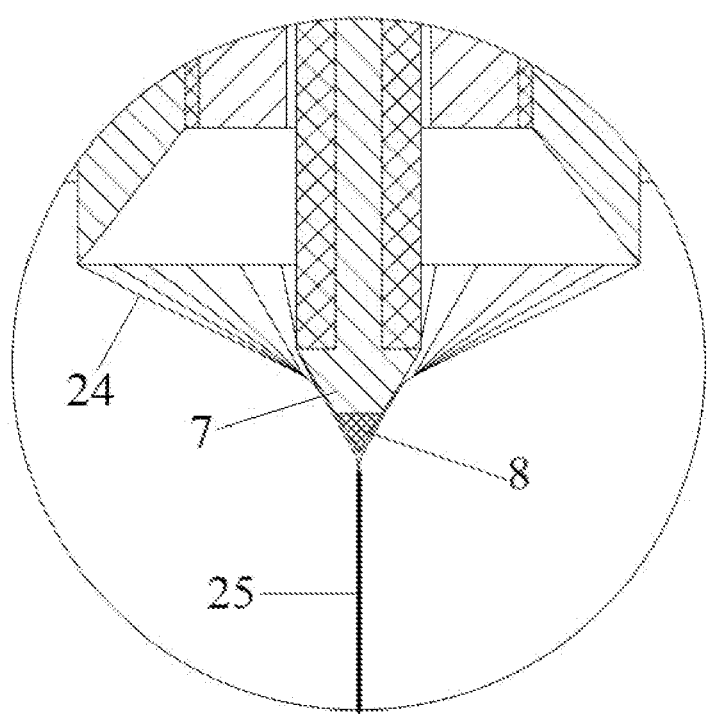
FIG. 3 is a partial structural schematic diagram II of a device for twisting electrostatic spinning superfine fiber in the first embodiment of the present disclosure.

As shown in FIG. 1 to FIG. 3 and FIG. 3, the embodiment provides a device 100 for twisting electrostatic spinning superfine fiber, comprising an outer sleeve 1 and a middle sleeve 2, wherein the outer sleeve 1 sleeves the middle sleeve 2, an annular gap 3 is formed between the outer sleeve 1 and the middle sleeve 2, a melt inlet 9 communicating with the annular gap 3 is formed in the outer sleeve 1, a conical hole is formed in the bottom end of the outer sleeve 1, the top end of the conical hole communicates with the bottom end of the annular gap 3, and the bottom end of the conical hole is an annular tip end; the outer sleeve 1 is wrapped with a heating ring 23 used for heating a melt in the annular gap 3; a cylindrical metal rod 6 is arranged in the middle sleeve 2 in a penetrating mode, an interval is formed between the metal rod 6 and the middle sleeve 2, the bottom end of the metal rod 6 is fixedly connected with a circular truncated cone 7 located below the conical hole, the relatively large-area bottom surface of the circular truncated cone 7 is fixedly connected with the bottom end of the metal rod 6, the relatively small-area bottom surface of the circular truncated cone 7 is fixedly connected with a conical guide tip end 8, and the conical surface of the guide tip end 8 is smoothly connected with the conical surface of the circular truncated cone 7; the metal rod 6, the circular truncated cone 7, the guide tip end 8 and the annular gap 3 are coaxial and all vertical; and the taper of the guide tip end 8 is the same as that of the circular truncated cone 7, and the size of the bottom surface of the guide tip end 8 is the same as that of the cross section of the circular truncated cone 7. The guiding tip end 8 is made of a high-temperature resistant insulating material such as polytetrafluoroethylene, so that spinning process interruption caused by self protection of the high-voltage electrostatic generator 16 due to electric conduction of the circular truncated cone 7 and the middle sleeve 2 is prevented; and the circular truncated cone 7 is made of a conductive material such as graphite or metal. In the embodiment, the circular truncated cone 7 at the bottom end of the metal rod 6 serves as a high-voltage electrode, the guiding tip end 8 is used for guiding the collecting direction of yarn 25. Meanwhile, the situation that the twisting turning radius is insufficient due to the fact that fiber 24 is attracted by the tip end is avoided, and the twisting effect is guaranteed.

In the embodiment, the device 100 for twisting electrostatic spinning superfine fiber further comprises an inner sleeve 5, wherein the metal rod 6 is inserted into the inner sleeve 5, the metal rod 6 is fixedly connected with the inner sleeve 5, the inner sleeve 5 is in running fit with the middle sleeve 2 through a sliding bearing 4, and the inner sleeve 5 and the sliding bearing 4 are arranged in the interval between the metal rod 6 and the middle sleeve 2; a rolling bearing 22 is further fixedly arranged at the top end of the middle sleeve 2, an outer ring of the rolling bearing 22 is fixedly connected with the middle sleeve 2, the rolling bearing 22 sleeves the inner sleeve 5, and the inner sleeve 5 is in transition fit with an inner ring of the rolling bearing 22. The extending distance of the conical surface high-voltage electrode at the bottom of the spinning nozzle outer sleeve 1 can be adjusted by sliding the inner sleeve 5 up and down relative to the rolling bearing 22.

In the embodiment, the device 100 for twisting electrostatic spinning superfine fiber further comprises a roller 10 below the guide tip end 8 and a speed-adjustable motor 11 capable of driving the metal rod 6 to rotate. The roller 10 can rotate and is adjustable in rotating speed. The roller 10 and a driving device thereof are common equipment in the spinning field, and the specific structures thereof will not be described in detail herein.

The metal rod 6 is electrically connected with an output electrode of a high-voltage electrostatic generator 16, the circular truncated cone 7 is conductive, the guide tip end 8 is isolated, and the outer sleeve 1 is grounded. An insulating shaft end sleeve 14 is fixedly arranged at the top end of the metal rod 6. A set screw 15 is arranged on the insulating shaft end sleeve 14, and the circumferential fixation of the insulating shaft end sleeve 14 and the metal rod 6 is realized through the set screw 15. An output shaft 12 of the adjustable-speed motor 11 is fixedly connected with the insulating shaft end sleeve 14 through a coupler 13. A carbon brush support 18 is fixedly arranged at the top end of the middle sleeve 2, the carbon brush support 18 is fixedly mounted on the middle sleeve 2, the carbon brush support 18 is connected with a carbon brush 21 through a spring 20, the carbon brush support 18 is further in threaded connection with a connecting screw 19, the connecting screw 19 is electrically connected with an output electrode of the high-voltage electrostatic generator 16 through a wire 17, the connecting screw 19 is further fixedly connected with the end, away from the carbon brush 21, of the spring 20, and the carbon brush 21 is in close contact with the side wall of the metal rod 6 under the elastic force of the spring 20. The tightness of the spring 20 can be adjusted by adjusting the screwing depth of the connecting screw 19.

The present disclosure also provides a method for twisting electrostatic spinning superfine fiber 24 based on the device 100 for twisting electrostatic spinning superfine fiber, comprising the following steps:

firstly, winding one end of a section of insulating string for a plurality of circles along the side surface of the circular truncated cone 7, slightly bonding with the side surface of the circular truncated cone 7 in order to ensure that the insulating string can be separated from the circular truncated cone 7 when the roller 10 drives the insulating string to rotate on the basis that the insulating string can rotate along with the circular truncated cone 7, winding the other end of the insulating string on the roller 10 for a plurality of circles, and turning on the high-voltage electrostatic generator 16;

secondly, after a polymer melt is melted and plasticized into a molten melt through an extruder, introducing the molten melt into the outer sleeve 1 through the melt inlet 9, and meanwhile, opening the heating ring 23, wherein after flowing into the annular gap 3 through the melt inlet 9, the molten melt continues to flow and is gradually and uniformly distributed in the circumferential direction, and then the molten melt continues to flow downwards to the inner side of the conical surface of the conical hole in the bottom of the outer sleeve 1; the molten melt naturally flows downwards to the annular tip end at the bottom end of the outer sleeve 1 along the inner wall surface due to the gravity effect and the adhesion effect and is annularly and uniformly distributed; and the heating ring 23 is used for maintaining the temperature of the melt so as to maintain the flowability of the melt;

thirdly, due to the fact that the circular truncated cone 7 is electrified after the high-voltage electrostatic generator 16 is started, forming a high-voltage electric field between the surface of the circular truncated cone 7 and the annular tip end at the bottom end of the outer sleeve 1 so that the annular tip end at the bottom end of the outer sleeve 1 is electrified in an induction mode, and adjusting the output voltage of the high-voltage electrostatic generator 16 until the melt thin layer attached to the annular tip end is excited to form multiple jet flows under the action of the high-voltage electric field, wherein the multiple jet flows are self-organized and gradually and uniformly distributed to form multiple jet flows which are uniformly and stably spaced, the jet flows are cooled and solidified to form continuous superfine fiber 24, and due to the electrostatic adsorption effect, the continuous superfine fiber 24 is adsorbed to the insulating string wound on the side surface of the circular truncated cone 7;

fourthly, turning on a rotary switch of the roller 10 to enable the roller 10 to rotate, winding the insulating string on the rotating roller 10 so as to pull and wind the superfine fiber 24 on the roller 10, continuously and automatically winding the bundled fiber 24 on the roller 10 due to the fact that the spun fiber 24 is continuous long fiber 24, turning on the adjustable-speed motor 11 to drive the circular truncated cone 7 to rotate, twisting a fiber 24 bundle adsorbed on the conical surface of the bottom of the circular truncated cone 7, and continuously collecting yarn 25 formed after twisting by the roller; and fifthly, adjusting the yarn 25 twist by adjusting the rotating speed of the adjustable-speed motor 11 so that the yarn 25 meets the technological requirements, and changing the quantity of jet flows formed by exciting the melt thin layer attached to the annular tip end by changing the output voltage of the high-voltage electrostatic generator 16 so that the technological requirement of the quantity of fiber 24 in the yarn 25 is met; and adjusting the twisting frictional force by changing the roughness of the side surface of the circular truncated cone.

Embodiment II

Figure 4:
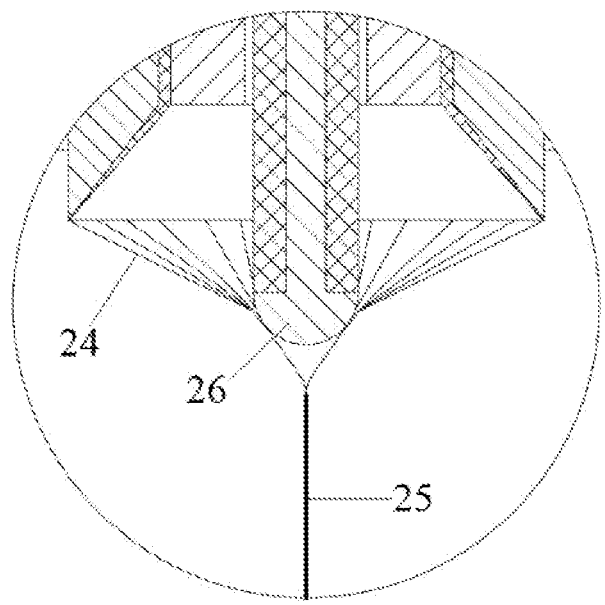
FIG. 4 is a partial structural schematic diagram of a device for twisting electrostatic spinning superfine fiber in the second embodiment of the present disclosure.

The device 100 for twisting electrostatic spinning superfine fiber provided by the embodiment is basically the same as the device 100 for twisting electrostatic spinning superfine fiber provided by the first embodiment in general structure, and the difference is only that, as shown in FIG. 4, the bottom end of the metal rod 6 in the device 100 for twisting electrostatic spinning superfine fiber is not provided with a circular truncated cone 7 or a guide tip end 8; however, a hemispherical body 26 is fixedly arranged as a high-voltage electrode, the spherical surface of the hemispherical body 26 faces downwards, the circular bottom surface of the hemispherical body 26 is fixedly connected with the bottom end of the metal rod 6, and the hemispherical body 26 and the metal rod 6 are coaxial.

Embodiment III

Figure 5:
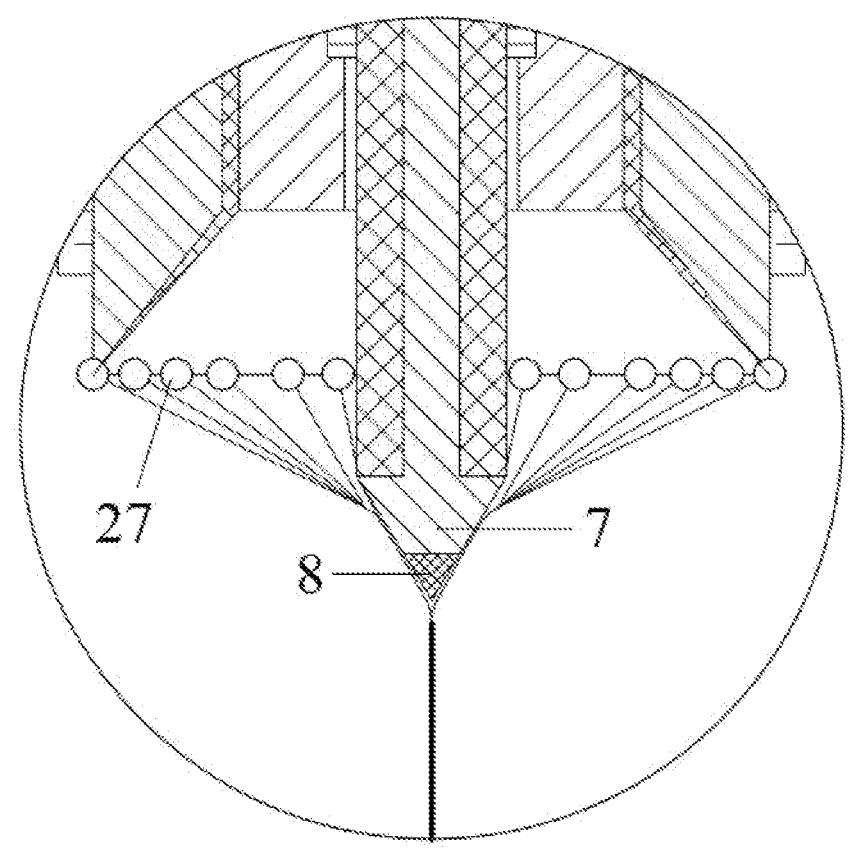
FIG. 5 is a partial structural schematic diagram of a device for twisting electrostatic spinning superfine fiber in the third embodiment of the present disclosure.
Figure 6:
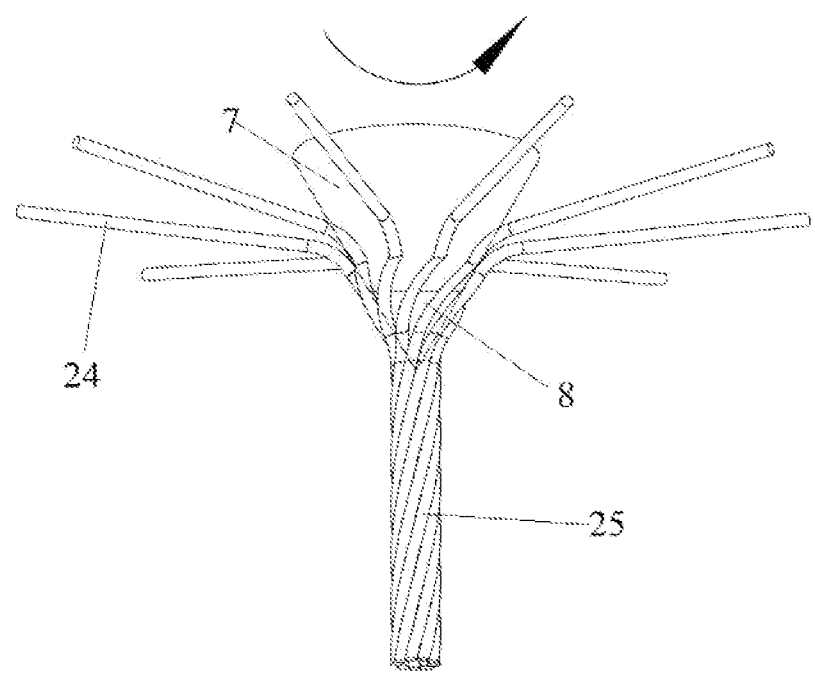
FIG. 6 is a partial structural schematic diagram III of a device for twisting electrostatic spinning superfine fiber in the first embodiment of the present disclosure.
Figure 7:
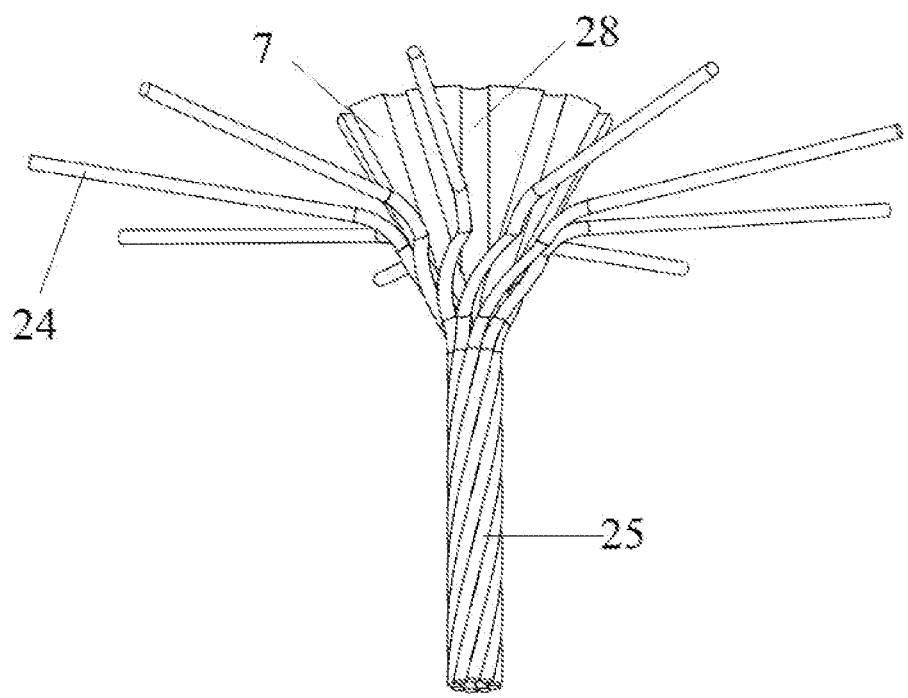
FIG. 7 is a partial structural schematic diagram of a device for twisting electrostatic spinning superfine fiber in the fourth embodiment of the present disclosure.

The device 100 for twisting electrostatic spinning superfine fiber provided by the embodiment is basically the same as the device 100 for twisting electrostatic spinning superfine fiber provided by the first embodiment in general structure, and the difference is only that, as shown in FIG. 5, a plurality of jet flow guide balls 27 are uniformly arranged at the bottom end of the conical hole in the bottom end of the outer sleeve 1, and an interval exists between every two adjacent jet flow guide balls 27. The jet flow guide balls 27 arranged in the embodiment are used for guiding the quantity of fixed fiber 24 to meet the specific process requirement.

Specifically, after flowing to the annular tip end along the inner conical surface of the conical hole in the bottom of the outer sleeve 1, the polymer melt is uniformly distributed on the annular tip end and the surface of the jet flow guide ball 27. The bottom tip end of the jet flow guide ball 27 protrudes out of the annular tip end. Therefore, due to the tip end discharge effect, the charge of the bottom tip end of the jet flow guide ball 27 is the most dense, a the field intensity of the bottom tip end of the jet flow guide ball 27 is the strongest, and a jet flow can be excited and formed. The melt also continuously flows to the surface of the jet flow guide ball to form the stable jet flow. Specifically, after the high-voltage electrostatic generator 16 is turned on, due to the tip end discharge effect, the induction field intensity near the bottom tip end of the jet flow guide ball 27 is the strongest. The melt attached to the bottom surface of the jet flow guide ball 27 is excited to form the jet flow. More melts on the surfaces of the jet flow guide balls 27 are taken away along with continuous operation of the jet flow. At the moment, more melts need to be supplemented to the surfaces of the jet flow guide balls 27, so that the melts on the surface of the inner conical surface are guided to be continuously supplemented to the surfaces of the jet flow guide balls 27. Due to the tip end discharge effect of the jet flow guide ball 27, the induction field intensity of the bottom tip end of the jet flow guide ball 27 is the strongest, jet flow is only generated at the bottom tip end of the jet flow guide ball 27, and the function of guiding the jet flow is achieved. Therefore, the quantity of the jet flows depends on the quantity of the jet flow guide balls 27, and the quantity of the finally formed jet flows can be controlled by changing the quantity of the jet flow guide balls 27.

Embodiment IV

The device 100 for twisting electrostatic spinning superfine fiber provided by the embodiment is basically the same as the device 100 for twisting electrostatic spinning superfine fiber provided by the first embodiment in general structure, and the difference is only that, as shown in FIG.

7, a plurality of semicircular grooves 28 are uniformly formed in the side surface of the circular truncated cone 7, and the length direction of the semicircular groove 28 is the same as the inclination direction of the side surface. The semicircular grooves 28 can be only distributed in the side surface of the circular truncated cone 7 and can also extend downwards to the conical surface of the guide tip end 8, and the semicircular grooves 28 can enhance the twisting effect of the circular truncated cone 7 on the high-voltage electrode of the superfine fiber.

Embodiment V

Figure 8:
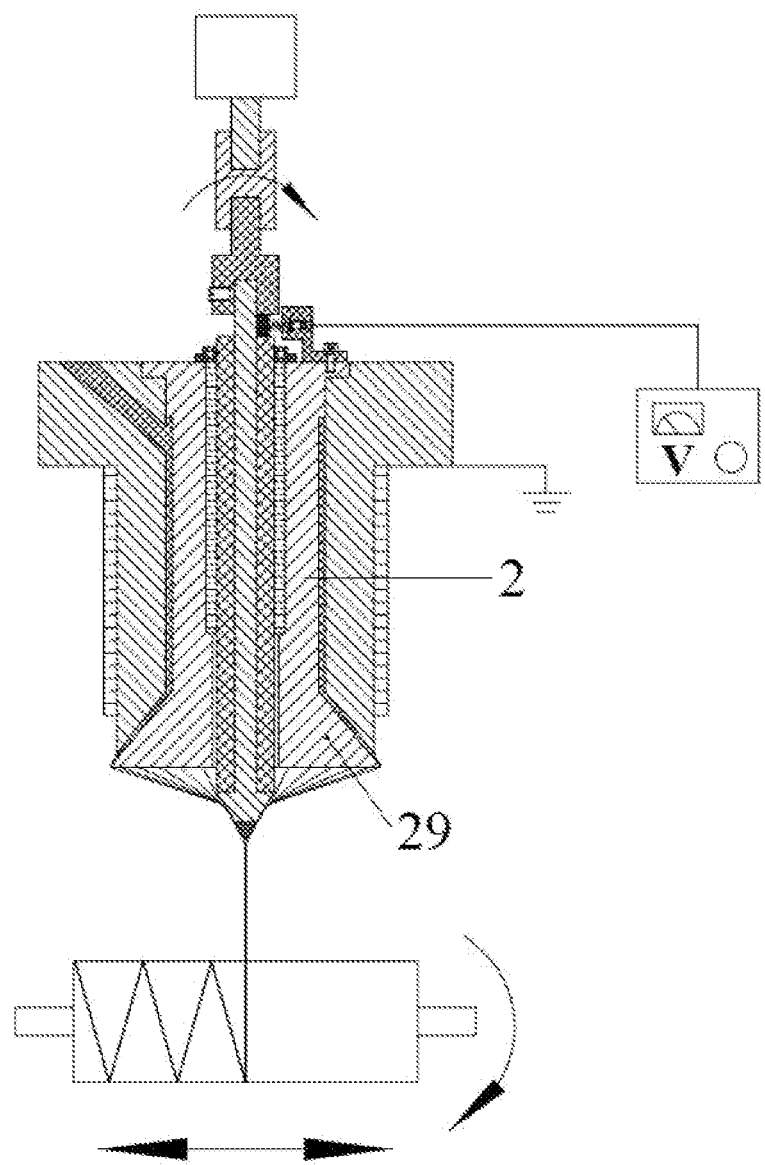
FIG. 8 is a structural schematic diagram of a device for twisting electrostatic spinning superfine fiber in the fifth embodiment of the present disclosure.

The device 100 for twisting electrostatic spinning superfine fiber provided by the embodiment is basically the same as the device 100 for twisting electrostatic spinning superfine fiber provided by the first embodiment in general structure, and the difference is only that, as shown in FIG. 8, the bottom end of the middle sleeve 2 is further provided with a conical body 29 coaxial with the metal rod 6 corresponding to the conical hole, the conical body 29 is located in the conical hole, an interval is formed between the conical surface of the conical body 29 and the conical surface of the conical hole, the edge of the bottom end of the conical body 29 extends out of the conical hole, the metal rod 6 and the inner sleeve 5 penetrate through the conical body 29, a gap is formed between the inner sleeve 5 and the conical body 29, and the circular truncated cone 7 is located below the conical body 29. In the embodiment, a molten fluid in the annular gap 3 can flow to the bottom edge of the conical body 29, the melt thin layer is formed at the bottom edge of the conical body 29 and is excited into the jet flow to be spun and twisted.

In the description of the present disclosure, it needs to be illustrated that the indicative direction or position relations of the terms such as "center", "top", "bottom", "left", "right", "vertical", "horizontal", "inside" and "outside" are direction or position relations illustrated based on the attached figures, just for facilitating the description of the present disclosure and simplifying the description, but not for indicating or hinting that the indicated device or element must be in a specific direction and is constructed and operated in the specific direction, the terms cannot be understood as the restriction of the present disclosure.

Specific examples are used for illustration of the principles and implementation methods of the present disclosure. The description of the above-mentioned embodiments is used to help illustrate the method and the core principles of the present disclosure; and meanwhile, those skilled in the art can make various modifications in terms of specific embodiments and scope of application in accordance with the teachings of the present disclosure. In conclusion, the content of this specification shall not be construed as a limitation to the present disclosure.

What is claimed is:

1. A device for twisting electrostatic spinning superfine fiber, comprising:
   an outer sleeve and a middle sleeve, wherein the outer sleeve sleeves the middle sleeve, an annular gap is formed between the outer sleeve and the middle sleeve, a melt inlet communicating with the annular gap is formed in the outer sleeve, a conical hole is formed in the bottom end of the outer sleeve, the top end of the conical hole communicates with the bottom end of the annular gap, and the outer sleeve is wrapped with a heating ring used for heating a melt in the annular gap;
   a cylindrical metal rod, wherein the cylindrical metal rod is arranged in the middle sleeve in a penetrating mode, an interval is formed between the metal rod and the middle sleeve, the bottom end of the metal rod is fixedly connected with a circular truncated cone located below the conical hole, a relatively large-area bottom surface of the circular truncated cone is fixedly connected with the bottom end of the metal rod, the relatively small-area bottom surface of the circular truncated cone is fixedly connected with a conical guide tip end, and the conical surface of the guide tip end is smoothly connected with the conical surface of the circular truncated cone; wherein the metal rod, the circular truncated cone, the guide tip end and the annular gap are coaxial;
   a roller below the guide tip end; and
   a driving device capable of driving the metal rod to rotate, wherein the metal rod is electrically connected with an output electrode of a high-voltage electrostatic generator, the circular truncated cone is conductive, the guide tip end is isolated, and the outer sleeve is grounded.

2. The device for twisting electrostatic spinning superfine fiber according to claim 1, further comprising:
   an inner sleeve, wherein the metal rod is inserted into the inner sleeve, the metal rod is fixedly connected with the inner sleeve, the inner sleeve is in running fit with the middle sleeve through a sliding bearing, and the inner sleeve and the sliding bearing are arranged in the interval; and
   a rolling bearing, wherein the rolling bearing is further fixedly arranged at the top end of the middle sleeve, an outer ring of the rolling bearing is fixedly connected with the middle sleeve, the rolling bearing sleeves the inner sleeve, and the inner sleeve is in transition fit with an inner ring of the rolling bearing.

3. The device for twisting electrostatic spinning superfine fiber according to claim 1, wherein an insulating shaft end sleeve is fixedly arranged at the top end of the metal rod, the driving device is an adjustable-speed motor, and an output shaft of the adjustable-speed motor is fixedly connected with the insulating shaft end sleeve through a coupler.

4. The device for twisting electrostatic spinning superfine fiber according to claim 1, wherein a carbon brush support is fixedly arranged at the top end of the middle sleeve, the carbon brush support is connected with a carbon brush through a spring, the carbon brush support is further in threaded connection with a connecting screw, the connecting screw is electrically connected with an output electrode of the high-voltage electrostatic generator through a wire, the connecting screw is further fixedly connected with the end away from the carbon brush of the spring, and the carbon brush is in close contact with the side wall of the metal rod under the elastic force of the spring.

5. The device for twisting electrostatic spinning superfine fiber according to claim 1, wherein the bottom end of the conical hole is an annular tip end; and a plurality of jet flow guide balls are uniformly arranged at the bottom end of the conical hole.

6. The device for twisting electrostatic spinning superfine fiber according to claim 2, wherein the bottom end of the middle sleeve is further provided with a conical body coaxial with the metal rod corresponding to the conical hole, the conical body is located in the conical hole, an interval is formed between the conical surface of the conical body and the conical surface of the conical hole, the edge of the bottom end of the conical body extends out of the conical hole, the metal rod and the inner sleeve penetrate through the conical body, a gap is formed between the inner sleeve and the conical body, and the circular truncated cone is located below the conical body.

7. The device for twisting electrostatic spinning superfine fiber according to claim 1, wherein a taper of the guide tip end is the same as that of the circular truncated cone, and the size of the bottom surface of the guide tip end is the same as that of the cross section of the circular truncated cone.

8. The device for twisting electrostatic spinning superfine fiber according to claim 1, wherein the guide tip end is made of a high-temperature resistant insulating material; and the circular truncated cone is made of graphite or metal.

9. The device for twisting electrostatic spinning superfine fiber according to claim 1, wherein a plurality of semicircular grooves are uniformly formed in the side surface of the circular truncated cone, and the length direction of the semicircular groove is the same as the inclination direction of the side surface.

10. A method for twisting electrostatic spinning superfine fiber, based on the device for twisting electrostatic spinning superfine fiber according to claim 1, comprising the following steps:

winding one end of a section of insulating string for a plurality of circles along the side surface of the circular truncated cone, bonding with the side surface of the circular truncated cone, winding the other end of the insulating string on the roller for a plurality of circles, and turning on the high-voltage electrostatic generator;

after a polymer melt is melted and plasticized into a molten melt through an extruder, introducing the molten melt into the outer sleeve through the melt inlet, and meanwhile, opening the heating ring, wherein after flowing into the annular gap through the melt inlet, the molten melt continues to flow and is gradually and uniformly distributed in the circumferential direction, and then the molten melt continues to flow downwards to the inner side of the conical surface of the conical hole in the bottom of the outer sleeve; and the molten melt naturally flows downwards to the annular tip end at the bottom end of the outer sleeve along the inner wall surface due to the gravity effect and the adhesion effect and is annularly and uniformly distributed;

due to the fact that the circular truncated cone is electrified after the high-voltage electrostatic generator is started, forming a high-voltage electric field between the surface of the circular truncated cone and the annular tip end at the bottom end of the outer sleeve so that the annular tip end at the bottom end of the outer sleeve is electrified in an induction mode, and adjusting the output voltage of the high-voltage electrostatic generator until the melt thin layer attached to the annular tip end is excited to form multiple jet flows under the action of the high-voltage electric field, wherein the multiple jet flows are self-organized and gradually and uniformly distributed to form multiple jet flows which are uniformly and stably spaced, the jet flows are cooled and solidified to form continuous superfine fiber, and due to the electrostatic adsorption effect, the continuous superfine fiber is adsorbed to the insulating string wound on the side surface of the circular truncated cone;

turning on a rotary switch of the roller to enable the roller to rotate, winding the insulating string on the rotating roller so as to pull and wind the superfine fiber on the roller, continuously and automatically winding the bundled fiber on the roller due to the fact that the spun fiber is continuous long fiber, turning on an adjustable-speed motor to drive the circular truncated cone to rotate, twisting the fiber bundle adsorbed on the conical surface of the bottom of the circular truncated cone, and continuously collecting yarn formed after twisting by the roller; and adjusting the yarn twist by adjusting the rotating speed of the adjustable-speed motor so that the yarn meets the technological requirements, and changing the quantity of jet flows formed by exciting the melt thin layer attached to the annular tip end by changing the output voltage of the high-voltage electrostatic generator so that the technological requirement of the quantity of fiber in the yarn is met.

11. The method for twisting electrostatic spinning superfine fiber according to claim 10, wherein the device comprises:

an inner sleeve, wherein the metal rod is inserted into the inner sleeve, the metal rod is fixedly connected with the inner sleeve, the inner sleeve is in running fit with the middle sleeve through a sliding bearing, and the inner sleeve and the sliding bearing are arranged in the interval; and a rolling bearing, wherein the rolling bearing is further fixedly arranged at the top end of the middle sleeve, an outer ring of the rolling bearing is fixedly connected with the middle sleeve, the rolling bearing sleeves the inner sleeve, and the inner sleeve is in transition fit with an inner ring of the rolling bearing.

12. The method for twisting electrostatic spinning superfine fiber according to claim 10, wherein an insulating shaft end sleeve is fixedly arranged at the top end of the metal rod, the driving device is an adjustable-speed motor, and an output shaft of the adjustable-speed motor is fixedly connected with the insulating shaft end sleeve through a coupler.

13. The method for twisting electrostatic spinning superfine fiber according to claim 10, wherein a carbon brush support is fixedly arranged at the top end of the middle sleeve, the carbon brush support is connected with a carbon brush through a spring, the carbon brush support is further in threaded connection with a connecting screw, the connecting screw is electrically connected with an output electrode of the high-voltage electrostatic generator through a wire, the connecting screw is further fixedly connected with the end away from the carbon brush of the spring, and the carbon brush is in close contact with the side wall of the metal rod under the elastic force of the spring.

14. The method for twisting electrostatic spinning superfine fiber according to claim 10, wherein the bottom end of the conical hole is an annular tip end; and a plurality of jet flow guide balls are uniformly arranged at the bottom end of the conical hole.

15. The method for twisting electrostatic spinning superfine fiber according to claim 11, wherein the bottom end of the middle sleeve is further provided with a conical body coaxial with the metal rod corresponding to the conical hole, the conical body is located in the conical hole, an interval is formed between the conical surface of the conical body and the conical surface of the conical hole, the edge of the bottom end of the conical body extends out of the conical hole, the metal rod and the inner sleeve penetrate through the conical body, a gap is formed between the inner sleeve and the conical body, and the circular truncated cone is located below the conical body.

16. The method for twisting electrostatic spinning superfine fiber according to claim 10, wherein a taper of the guide tip end is the same as that of the circular truncated cone, and the size of the bottom surface of the guide tip end is the same as that of the cross section of the circular truncated cone.

17. The method for twisting electrostatic spinning superfine fiber according to claim 10, wherein the guide tip end is made of a high-temperature resistant insulating material; and the circular truncated cone is made of graphite or metal.

18. The method for twisting electrostatic spinning superfine fiber according to claim 10, wherein a plurality of semicircular grooves are uniformly formed in the side surface of the circular truncated cone, and the length direction of the semicircular groove is the same as the inclination direction of the side surface.

19. A method for twisting electrostatic spinning superfine fiber comprising the following steps:
- winding one end of a section of insulating string for a plurality of circles along the side surface of a circular truncated cone, bonding with a side surface of the circular truncated cone, winding the other end of the insulating string on a roller for a plurality of circles, and turning on a high-voltage electrostatic generator;
- after a polymer melt is melted and plasticized into a molten melt through an extruder, introducing the molten melt into an outer sleeve through a melt inlet, and meanwhile, opening a heating ring, wherein after flowing into an annular gap through the melt inlet, the molten melt continues to flow and is gradually and uniformly distributed in the circumferential direction, and then the molten melt continues to flow downwards to the inner side of the conical surface of a conical hole in the bottom of an outer sleeve; and the molten melt naturally flows downwards to an annular tip end at the bottom end of the outer sleeve along the inner wall surface due to the gravity effect and the adhesion effect and is annularly and uniformly distributed;
- due to the fact that the circular truncated cone is electrified after the high-voltage electrostatic generator is started, forming a high-voltage electric field between the surface of the circular truncated cone and the annular tip end at the bottom end of the outer sleeve so that the annular tip end at the bottom end of the outer sleeve is electrified in an induction mode, and adjusting the output voltage of the high-voltage electrostatic generator until the melt thin layer attached to the annular tip end is excited to form multiple jet flows under the action of the high-voltage electric field, wherein the multiple jet flows are self-organized and gradually and uniformly distributed to form multiple jet flows which are uniformly and stably spaced, the jet flows are cooled and solidified to form continuous superfine fiber, and due to the electrostatic adsorption effect, the continuous superfine fiber is adsorbed to the insulating string wound on the side surface of the circular truncated cone;
- turning on a rotary switch of the roller to enable the roller to rotate, winding the insulating string on the rotating roller so as to pull and wind the superfine fiber on the roller, continuously and automatically winding the bundled fiber on the roller due to the fact that the spun fiber is continuous long fiber, turning on an adjustable-speed motor to drive the circular truncated cone to rotate, twisting the fiber bundle adsorbed on the conical surface of the bottom of the circular truncated cone, and continuously collecting yarn formed after twisting by the roller; and
- adjusting the yarn twist by adjusting the rotating speed of the adjustable-speed motor so that the yarn meets the technological requirements, and changing the quantity of jet flows formed by exciting the melt thin layer attached to the annular tip end by changing the output voltage of the high-voltage electrostatic generator so that the technological requirement of the quantity of fiber in the yarn is met.

\* \* \* \* \*